Patented Dec. 8, 1936

2,063,246

UNITED STATES PATENT OFFICE 2,063,246

ANTHRAQUINONE DYESTUFFS

Norman Hulton Haddock and Frank Lodge, Blackley, Manchester, England, assignors to Imperial Chemical Industries Limited, a corporation of Great Britain No Drawing. Application July 28, 1933, Serial No. 682,728. In Great Britain August 2, 1932

7 Claims. (Cl. 260—60)

This invention relates to the manufacture of new anthraquinone dyestuffs, and to their application.

According to the invention we effect interaction between an anthraquinone carboxylic halide of which the anthraquinone radical carries one or more auxochromic groups and a nitroaminophenylthioglycollic acid, especially 2-nitro-4-aminophenylthioglycollic acid, wherein the nitro and thioglycollic acid substituents stand ortho to one another, or an amino-3-keto-2,4-dihydrobenz-1,4-thiazine, and afterwards reducing when a nitroaminophenylthioglycollic acid is used or hydrolyzing when an amino-3-keto-2,3-dihydrobenz-1,4-thiazine to give a compound of the general formula

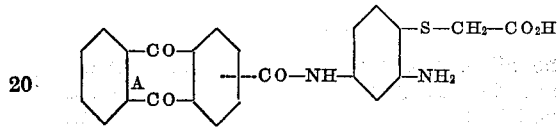

wherein the dotted linkages passing into the centre of the hexagon are intended to indicate that the substitution may be in any position, and wherein the anthraquinone radical A carries auxochromic substituents as described. 2-nitro-4-aminophenyl-1-thioglycollic acid is obtainable by the process described in British Patent 406,281.

The new compounds obtained according to our invention are new dyestuffs and they are applied to the fibre to give fast dyeings according to the method described in British Patent 421,969, that is to say, the new dyestuffs, capable in themselves of dyeing animal fibres by the ordinary processes from a neutral or weakly acid bath, are so applied and the dyed fibre is then treated with hot dilute mineral acid, to give dyeings of increased fastness to potting.

The invention includes also a further treatment of some of the compounds obtained by the interaction of the carboxylic halide and the thioglycollic acid, namely those in which the anthraquinone radical carries a replaceable halogen atom. According to this feature of the invention we treat such a compound with an amine or amide capable of so reacting that the halogen atom is replaced by a substituted amino or amido group. After treatment according to this further feature we reduce as before.

The dyestuffs so-obtained are applicable to the fibre in the same way as the parent substances.

The invention is illustrated but not limited by the following examples in which the parts are by weight.

Example 1

21.36 parts of 1-aminoanthraquinone-2-carboxylic acid, 200 parts of nitrobenzene and 10 parts of thionyl chloride are mixed, heated to 100–110° C. and stirred for about half-an-hour. 1-aminoanthraquinone-2-carboxylic chloride is formed and the mixture gradually becomes a clear red solution. 36 parts of 2-nitro-4-aminophenylthioglycollic acid are now added. The mixture is stirred for about an hour at 110–120° C. and gradually thickens. After cooling the brownish red crystals are filtered off, washed with industrial methylated spirits, and dried at 90° C. The so-obtained nitro compound dissolves in concentrated sulphuric acid to a yellow solution, which on adding formaldehyde becomes blue.

For reduction, 15 parts of the nitro compound, 10 parts of 33% aqueous caustic soda solution, 500 parts of water and 60 parts of sodium sulphide crystals are mixed and warmed to 75–80° C. with stirring for ½ hour. After cooling to 40°, the crystalline residue is filtered off, washed with 5% brine and dried at 90° C. The new dyestuff is a dark red powder. It is applied to the fibre according to the method described in British Patent 421,969.

0.18 parts of the dyestuff powder are dissolved in 200 cc. of boiling water. 6 parts of well wetted wool are entered followed by 8 parts of a 10% solution of Glauber's salt. The bath being kept boiling, 3 cc. of 1% acetic acid are gradually added over ½ hour and after a further ¼ hour the wool is removed, and rinsed in cold dilute sodium carbonate solution. The fibre which is dyed in a bright red shade is entered into a bath containing 200 parts of water and 9 parts of 34% hydrochloric acid. The bath is heated and kept at 90° C. for ¼ hour. The lactamization is then complete and the shade has changed to a bright orange. The pattern is finally rinsed in cold dilute sodium carbonate solution and water. The lactamized dyeing shows remarkable fastness to washing and boiling tests which is not shown by the dyeing before lactamization.

Example 2

36.55 parts of 1-chloro-4-bromoanthraquinone-2-carboxylic acid, 400 parts of nitrobenzene, and 12.5 parts of thionyl chloride are mixed and heated at 110° C. for 1 hour with stirring. The acid chloride solution is cooled to 60° C. and 46 parts of 2-nitro-4-aminophenylthioglycollic acid are added. The mixture is stirred at 115–120° C. and the product is then filtered off and washed successively with nitrobenzene, alcohol and hot water. The dried product is a brownish yellow crystalline substance, readily soluble in dilute alkali.

30 parts of this product, 375 parts of water, 75 parts of aniline, 15 parts of sodium carbonate, and 0.75 part copper acetate are mixed together and the mixture is boiled gently with stirring for 14 hours. The dark-green solution obtained is filtered to remove insoluble matter, and the anilated compound is precipitated by adding hydrochloric acid. It is filtered off and washed with water.

The so-obtained dark green paste is suspended in 1500 parts of water and enough ammonia added to give complete solution. 90 parts of sodium sulphide crystals are added at 70° C. and the solution is stirred at 90°–95° C. for ¼ hour. The reduction product is precipitated at 50° C. by adding salt, filtered, washed with 10% salt solution, and dried.

The new dyestuff is a dark green powder, soluble in concentrated sulphuric acid to a dark green solution. It dissolves readily in warm water and is applied to wool in the manner described in Example 1. The change in shade on lactamization is slight with this product. The "lactamized" shades are green and superior to the direct shades in washing and potting fastness.

Example 3

34.6 parts of 4-bromo-1-aminoanthraquinone-2-carboxylic acid, 300 parts of nitrobenzene, and 12.5 parts of thionyl chloride are stirred and heated at 100–110° C. for 1 hour. The clear red solution of the acid chloride is cooled to 60° C. and 46 parts of 2-nitro-4-aminophenylthioglycollic acid are added. The mixture is then heated at 120–125° C. with good stirring. The product separates in brownish-red crystals. After 1 hour the mixture is cooled to 50° C., filtered, and the residue is washed successively with nitrobenzene, alcohol, and warm water.

This product gives a red solution with dilute aqueous sodium carbonate and with concentrated sulphuric acid a yellow solution.

25 parts of this product, 500 parts of water, 17.5 parts of sodium carbonate, 0.5 part of copper bronze, 0.5 part of copper acetate, and 25 parts of aniline are mixed and boiled gently with stirring for 8 hours. The bluish-green solution is diluted with hot water and filtered to remove any suspended matter. 75 parts of sodium sulphide crystals are then added at 70° C. and reduction is effected by heating the solution to 90–95° C. for 15 minutes. The new dyestuff is precipitated by addition of salt and filtered off.

The new dyestuff is a dark blue powder which dissolves in water to a blue solution. When dyed on wool by the method described in Example 1 blue shades are obtained.

The dyestuff may be converted to the corresponding thiazine by heating with mineral acid.

Example 4

21.36 parts of 1-aminoanthraquinone-2-carboxylic acid, 200 parts of nitrobenzene and 10 parts of thionyl chloride are mixed, heated to 100–110° C. and stirred for half-an-hour. 30 parts of 7-amino-3-keto-2,3-dihydro-1,4-thiazine are now added. The mixture is stirred for an hour at 110–120° C. and the condensation product gradually separates. After cooling the bluish-red crystals are filtered off, washed with industrial methylated spirits and dried below 100° C.

For conversion to the water-soluble dyestuff 20 parts of condensation product are hpdrolyzed by boiling with 200 parts of 33% aqueous caustic soda solution for 20 minutes. After cooling and diluting with 1000 parts of cold water the product is filtered and washed with 2% brine.

The so-obtained dyestuff dissolves in hot water to a red solution. When dyed on wool in the manner exemplified in Example 1 and lactamized on the fibre bluish-red shades are obtained which show superior fastness to washing and potting when compared with the direct, unlactamized shades.

Example 5

37.1 parts of 5-benzoylamino anthraquinone 1-carboxylic acid, 250 parts of nitrobenzene and 18 parts thionyl chloride are heated together at 160° C. for ½ hour. After cooling and diluting with 300 parts of ligroin the product is filtered off, washed with ligroin and dried.

19.5 parts of the so-obtained 5-benzoylamino anthraquinone 1-carboxylic acid chloride, 250 parts nitrobenzene and 23 parts of 2-nitro-4-aminophenylthioglycollic acid are stirred together at 125° C. for 1 hour. After cooling and diluting the mixture with alcohol the product is filtered off, washed with alcohol and hot water and dried.

The so-obtained condensation product is then converted into dyestuff by reduction at 50° C. in aqueous medium with alkaline hydrosulphite. The reduction mixture is oxidized by air-blowing and the product precipitated with salt.

The dyestuff dissolves in hot water to a clear yellow solution and when applied to wool in the manner described in Example 1 and lactamized on the fibre clear yellow shades are obtained which show superior fastness to washing and potting tests when compared with the unlactamized dyeings.

The dyestuff may be converted to the corresponding thiazine by heating with mineral acid.

Example 6

The nitrobenzene solution of 1-aminoanthraquinone 2-carboxylic chloride obtained as in Example 1 is treated with 40 parts of 2-nitro-4-aminophenyl-α-methylthioglycollic acid and the mixture stirred at 120° C. for about an hour. After cooling the reddish product is filtered off, washed with industrial methylated spirits and dried.

The so-obtained condensation product is reduced and converted to the water-soluble dyestuff by the method described in Example 1.

The dyestuff obtained yields a clear red solution in warm water and dyes wool direct in bright red shades which become somewhat blues on lactamization. The final bluish-red lactamized shade is much superior in washing, milling and potting fastness to the un-lactamized shade.

We claim:

1. A compound which in the form of free acid has the general formula

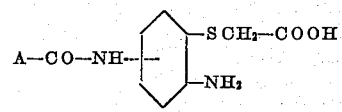

wherein A stands for an anthraquinone nucleus carrying an auxochromic substituent.

2. A compound which in the form of free acid has the general formula

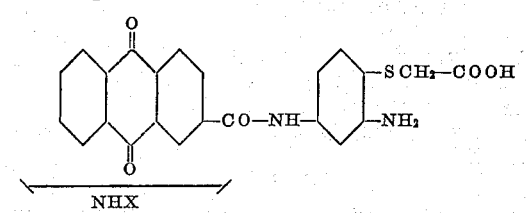

wherein X stands for one of the group consisting of hydrogen and aryl radicals, and wherein the group NHX is attached in an alpha-position.

3. The aryl amino thioglycollic acid having the formula

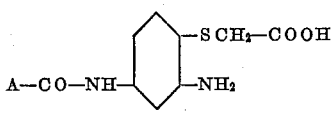

wherein A stands for an anthraquinone nucleus carrying an auxochromic substituent.

4. The aryl amino thioglycollic acid having the formula

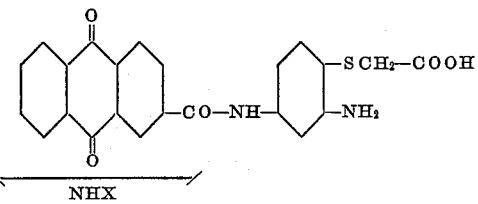

wherein X stands for one of the group consisting of hydrogen and aryl radicals, and wherein the group NHX is attached in an alpha-position.

5. The process of preparing a dyestuff compound adapted to dye wool by lactamization on the fibre, which comprises forming a compound of the general formula

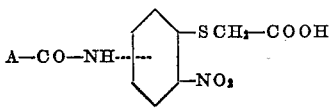

wherein A stands for an anthraquinone radical carrying an auxochromic substituent, and reducing the nitro group in said compound to the free amine.

6. The process of preparing a dyestuff compound, which comprises reacting an anthraquinone-carboxylic acid chloride which carries an auxochromic substituent with an aminophenyl-o-nitrothioglycollic acid, and reducing the resulting intermediate to the free amine.

7. A process for the manufacture of new dyestuffs which consists in interacting an anthraquinone carboxylic halide of which the anthraquinone radical carries at least one auxochromic group and a 2-nitro-4-amino-phenylthioglycollic acid and afterwards reducing to give a compound of the general formula

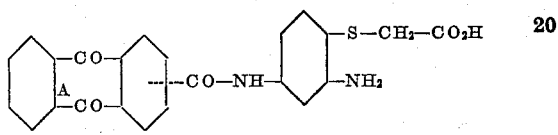

wherein the anthraquinone radical A carries an auxochromic substituent as stated.

NORMAN HULTON HADDOCK.
FRANK LODGE.